United States Patent
Graffi et al.

(10) Patent No.: US 8,543,809 B2
(45) Date of Patent: Sep. 24, 2013

(54) METHOD FOR MISBEHAVIOUR DETECTION IN SECURE WIRELESS MESH NETWORKS

(75) Inventors: Kalman Graffi, Frankfurt (DE);
Matthias Hollick, Darmstadt (DE);
Parag Sudhir Mogre, Darmstadt (DE);
Andreas Ziller, München (DE)

(73) Assignee: Siemens Aktiengesellschaft, Munich (DE)

( * ) Notice: Subject to any disclaimer, the term of this patent is extended or adjusted under 35 U.S.C. 154(b) by 343 days.

(21) Appl. No.: 12/676,039

(22) PCT Filed: Sep. 3, 2008

(86) PCT No.: PCT/EP2008/061586
§ 371 (c)(1),
(2), (4) Date: Mar. 2, 2010

(87) PCT Pub. No.: WO2009/030693
PCT Pub. Date: Mar. 12, 2009

(65) Prior Publication Data
US 2010/0180113 A1    Jul. 15, 2010

(30) Foreign Application Priority Data

Sep. 6, 2007 (EP) .................................... 07017485
Nov. 21, 2007 (EP) .................................... 07022624

(51) Int. Cl.
*H04L 29/06* (2006.01)
(52) U.S. Cl.
USPC ........................................................ 713/153
(58) Field of Classification Search
USPC ....... 713/153, 181; 726/22, 23, 24; 709/224, 709/238
See application file for complete search history.

(56) References Cited

U.S. PATENT DOCUMENTS

| | | | | |
|---|---|---|---|---|
| 7,665,126 B2 * | 2/2010 | Simon et al. | ...................... | 726/6 |
| 7,711,361 B2 * | 5/2010 | Wang et al. | ................ | 455/432.1 |
| 8,108,036 B2 * | 1/2012 | Tran | .............................. | 600/509 |
| 8,239,915 B1 * | 8/2012 | Satish et al. | ...................... | 726/1 |
| 2005/0027778 A1 * | 2/2005 | Dimitrelis et al. | ............ | 709/200 |

OTHER PUBLICATIONS

D. Denjouri et. al., "A survey of security issues in mobile and ad hoc and sensor networks", Communications Surveys & Tutorials, IEEE vol. 7, No. 4, pp. 2-28, Oct. 1, 2005 (28 pages).
S. Marti et. al., "Mitigating Routing Misbehavior in Mobile Ad Hoc Networks", Sixth Annual International Conference on Mobile Computing and Networking, 2000, pp. 255-265 (12 pages).

(Continued)

*Primary Examiner* — Beemnet Dada
(74) *Attorney, Agent, or Firm* — King & Spalding L.L.P.

(57) ABSTRACT

In a method for secure data transmission in a wireless mesh network, a sending node sends at least one packet to at least one forwarding node which receives the packet from the sending node and forwards the packet to one or more receiving nodes. A destination node receives the packet. A challenge is transmitted from the sending node to the forwarding node causing the forwarding node to reply both to the sending and the receiving node with a response which has transformed information about one or more of the packet/packets. The response is processed to find out whether the forwarding node is misbehaving or not by verifying whether the transformed information is equal to an information which can be or has been derived from the requested packet/packets, wherein the processing is carried out both by the sending node and the receiving node.

21 Claims, 2 Drawing Sheets

(56) References Cited

OTHER PUBLICATIONS

L. Buttyan et. al., "Enforcing Service Availability in Mobile Ad-Hoc WANs", Proceedings of the First IEEE/ACM Workshops on Mobile Ad Hoc Networking and Computing (MobiHoc), Boston, MA, USA, May 3, 2000 (16 pages).

Zhong et. al., "Sprite: A Simple, Cheat-Proof, Credit-Based System for Mobile Ad-Hoc Networks", 2002 (online: citeseer.ifi.unizh,ch/zhong02sprite.html) (12 pages).

F. Kargl et. al., "Advanced Detection of Selfish or Malicious Nodes in Ad Hoc Networks", Proceedings from $1^{st}$ European Workshop on Security in Ad-Hoc Sensor Networks (ESS 2004), Springer Lecture Notes in Computer Science, Heidelberg, Sep. 1, 2004 (14 pages).

Dr. Djenouri et. al., "Cross-Layer Approach to Detect Data Packet Droppers in Mobile Ad-Hoc-Networks", H. de Meer and J. P. G. Sterbenz, "Self-Organizing Systems", First International Workshop, ISSOS 2006, Passau Germany, Sep. 18-20, 2006, Proceedings ser. Lecture Notes in Computer Science, Eds., vol. 4124, Springer 2006, pp. 163-175 (26 pages).

G. Mathur et. al., "Securing Routing in Open Networks Using Secure Traceroute", Technical Report, Microsoft Research, [online] Jul. 1, 2004, http://research.microsoft.com/~padmanab/papers/msr-tr-2004-66.pdf (16 pages).

Sen. J et. al., "A Distributed Protocol for Detection of Packet Dropping Attack in Mobile Ad Hoc Networks", IEEE International Conference on Telecommunications and Malaysia International Conference on Communications, May 14, 2007. ICT-MICC 2007, pp. 75-80, ISBN: 978-1-4244-1093-4 (12 pages).

Fahad et. al., "A New Low Cost Sessions-Based Misbehavior Detection Protocol (SMDP) for MANET", $21^{st}$ International Conference on Advanced Information Networking and Applications Workshops, 2007, Ainaw '07. May 1, 2007 pp. 882-887, ISBN: 978-0-7695-2847-2 (6 pages).

\* cited by examiner

| Syntax | Size | Notes |
|---|---|---|
| Mesh Subheader { | | |
| Xmt Node Id | 16 bits | |
| Node Id | 16 bits | |
| } | | |

FIG 3

| Syntax | Size |
|---|---|
| WatchAnt Request{ | |
| Nr. challenged Nodes (n) | 8 bits |
| for(int i=0; i<n; i++){ | |
| Node Id | 16 bits |
| } | |
| Packet Count | 16 bits |
| } | |

FIG 4

| Syntax | Size |
|---|---|
| WatchAnt Reply{ | |
| Previous Hop | 16 bits |
| Nr. next Hop Nodes (n) | 8 bits |
| for(int i=0; i<n; i++){ | |
| Node Id | 16 bits |
| } | |
| Nr. packets forwarded | 16 bits |
| Hash Value | 160 bits |
| } | |

METHOD FOR MISBEHAVIOUR DETECTION IN SECURE WIRELESS MESH NETWORKS

CROSS-REFERENCE TO RELATED APPLICATIONS

This application is a U.S. National Stage Application of International Application No. PCT/EP2008/061586 filed Sep. 3, 2008, which designates the United States of America, and claims priority to EP Application No. 07017485.9 filed Sep. 6, 2007 and EP Application No. 07022624.6 filed Nov. 21, 2007, the contents of which are hereby incorporated by reference in their entirety.

TECHNICAL FIELD

The invention relates to a method for secure data transmission in a wireless mesh network. The mesh network comprises a sending node sending at least one packet to at least one forwarding node, the at least one forwarding node receiving the at least one packet from the sending node and forwarding the at least one packet to one or more receiving nodes, and a destination node receiving the at least one packet from the at least one receiving node. The invention further relates to a computer program product. Furthermore, the invention relates to nodes in a wireless mesh network and a wireless mesh network.

BACKGROUND

Wireless mesh networks build on user nodes to form the network's routing infrastructure. In particular, the correct forwarding behaviour of each intermediate node on a multi-hop path from the source node to the destination node is crucial for the functioning of the mesh network. According to the above introduction the at least one forwarding node and the one or more receiving nodes represent intermediate nodes. The sending node can be an intermediate node, too. However, current secure routing solutions and misbehaviour detection mechanisms are not sufficient and mostly inapplicable in mesh networks.

In "Mitigating Routing Misbehaviour in Mobile Ad Hoc Networks", S. Marti, T. Giuli, K. Lai, and M. Baker, in Sixth Annual International Conference on Mobile Computing and Networking, 2000, pp. 255-265, the idea of a watchdog and pathrater have been introduced in order to solve the problem of malicious nodes. The main idea of the mechanism is to store an identifier for every packet forwarded to a neighbour node and, by overhearing, validate whether the neighbour forwards this packet or not. Promiscuous listening on the wireless channel has several limitations. There are scenarios where transmission collisions occur on the physical layer and the behaviour of neighbouring nodes cannot be verified. Also, an efficient bandwidth utilization might rely on planning of simultaneous transmissions within a two hop neighbourhood which also prohibits reliable promiscuous listening.

In "Advanced Detection of Selfish or Malicious Nodes in Ad Hoc Networks", F. Kargl, S. Schlott, A. Klenk, A. Geiss, and M. Weber, in Proceedings of $1^{st}$ European Workshop on Security in Ad-Hoc and Sensor Networks (ESAS 2004), Springer Lecture Notes in Computer Science, Heidelberg, September 2004, iterative probing is presented which is a mechanism to detect black holes on routes. It is assumed that a field in each packet that contains encrypted information is only decipherable by a single node on the route. This node has to acknowledge the receipt of the packet. Starting from the destination node the source node iteratively addresses every single node on the route. Malicious nodes that drop messages (packets) can thus be identified by means of probing mechanism: The last acknowledgement is either from the malicious node in the route or from the node one hop before. However, the approach is limited to source routing and necessitates changes on network layer of the mesh network.

In some wireless mesh networks there is a hop-by-hop per-link encryption of the transmitted packets. In these wireless mesh networks, misbehaviour of intermediate nodes cannot be controlled by overhearing of the wireless channel. The detection of malicious intermediate nodes that refuse to forward messages is a necessary and challenging task in decentralized, open mesh networks.

SUMMARY

According to various embodiments, a method for secure data transmission in a wireless mesh network can be provided which detects misbehaviour in forwarding data messages as well as routing messages and which is in addition able to cope with a per-link encryption at a MAC layer of the wireless mesh network. According to further embodiments, a computer program product can be provided. According to further embodiments, nodes in a wireless mesh network can be provided which are able to implement and carry out the method. Furthermore, according to yet further embodiments, a wireless mesh network can be provided in which detecting misbehaviour in forwarding data messages as well as routing messages is possible while per-link encryption at the MAC layer is activated.

According to an embodiments, a method for secure data transmission in a wireless mesh network with—a sending node sending at least one packet to at least one forwarding node, —the at least one forwarding node receiving the at least one packet from the sending node and forwarding the at least one packet to one or more receiving nodes, —a destination node receiving the at least one packet from the at least one receiving node, may comprise the steps of: —transmitting a challenge from the sending node, being a challenging node, to the at least one forwarding node causing the at least one forwarding node, being a challenged node, to reply both to the sending node and the at least one receiving node with a response, the response at least comprising transformed information about one or more of the at least one packet/packets which has/have been sent form the sending node to the destination node via the at least one forwarding node and the at least one receiving node, and—processing the response to find out whether the at least one forwarding node is misbehaving or not by verifying whether the transformed information is equal to an information which can be or has been derived from the requested packet/packets, wherein the processing is carried out both by the sending node and the at least one receiving node.

According to a further embodiment, the transformed information may be a hash sum for the requested packet/packets in the challenge, especially for immutable parts of the requested packet/packets. According to a further embodiment, the hash sum may be generated by a logic operation from hash values of respective packets. According to a further embodiment, the hash sum and/or the hash values may be calculated by a one-way hash function. According to a further embodiment, in the challenge, the transformed information about the last x packets can be requested which packets have been sent from the sending node to the destination node via the at least one forwarding node and the at least one receiving node. According to a further embodiment, the response further may comprise an identifier of the challenging node being a previous hop of the challenged node receiving the challenge. According to a further embodiment, the response further may comprise an identifier of the next hop of the challenged node receiving the challenge of the requested and transmitted packets. According to a further embodiment, the response further may comprise the number of requested packets transmitted from the challenging node to the challenged node. According to a further embodiment, the response to the challenging node and the receiving node can be without encryption. According to a further embodiment, the response to the challenging node and the receiving node can be with encryption. According to a further embodiment, the response can be transmitted as a broadcast message. According to a further embodiment, the response can be processed by nodes which are addressed in the response. According to a further embodiment, each of the sending nodes, the at least one forwarding node, the at least one receiving node and the destination node may maintain a first list for information about packets received from a neighbour node and a second list for storing information about packets sent to a neighbour node. According to a further embodiment, for each received packets stored in the first list one or more of the following parameters can be stored: —the hash value, —the identifier of the previous neighbour node which transmitted the packet, —the identifier of the node which transmitted the packet prior to the previous neighbour node, —an information about the next hop for the packet. According to a further embodiment, for each transmitted packet stored in the second list one or more of the following parameters can be stored: —the hash value, —the identifier of the next neighbour node to which the packet is forwarded, —the identifier of the previous neighbour node which transmitted the packet. According to a further embodiment, the first and the second list in one of the nodes can be updated on receiving or transmitting a packet. According to a further embodiment, the challenge can be transmitted periodically.

According to another embodiments, a computer program product may be directly loadable into the internal memory of a digital computer, comprising software code portions for performing the steps of the method as described above when said product is run on a computer.

According to yet another embodiments, a node in a wireless mesh network, wherein the wireless mesh network comprises—
a sending node sending at least one packet to at least one forwarding node, —the at least one forwarding node receiving the at least one packet from the sending node and forwarding the at least one packet to one or more receiving nodes, —a destination node receiving the at least one packet from the at least one receiving node, May be a challenging node comprising: —a first means for transmitting a challenge to the at least one forwarding node causing the at least one forwarding node, being a challenged node, to reply both to the challenging node and the at least one receiving node with a response, the response at least comprising transformed information about one or more of the at least one packet/packets which has/have been sent form the challenging node to the destination node via the at least one forwarding node and the at least one receiving node, —a second means for processing the response to find out whether the at least one forwarding node is misbehaving or not by verifying whether the transformed information is equal to an information which can be or has been derived from the requested packet/packets, wherein the processing is carried out both by the sending node and the at least one receiving node.

According to a further embodiment, the node may comprise further means for carrying out further steps according to a method as described above.

According to yet another embodiments, a node in a wireless mesh network, wherein the wireless mesh network comprises—a sending node sending at least one packet to at least one forwarding node, —the at least one forwarding node receiving the at least one packet from the sending node and forwarding the at least one packet to one or more receiving nodes, —a destination node receiving the at least one packet from the at least one receiving node,
may be a challenged node, comprising a means for receiving and processing a challenge from the sending node, being a challenging node, causing the challenged node to reply both to the challenging node and the at least one receiving node with a response, the response at least comprising transformed information about one or more of the at least one packet/packets which has/have been sent form the challenging node to the destination node via the at least one forwarding node and the at least one receiving node, wherein the transformed information can be derived from the requested packet/packets.

According to a further embodiment, the node may comprise further means for carrying out further steps according to a method as described above.

According to yet another embodiments, a wireless mesh network may comprise at least one node behaving as a challenging node as described above.

According to yet another embodiments, a wireless mesh network may comprise at least one node behaving as a challenged node as described above.

BRIEF DESCRIPTION OF THE DRAWINGS

Further improvements of the invention will be described by reference to the accompanying figures.

FIG. 3 shows the message format of a challenge, and FIG. 4 shows the message format of a response in reaction to the challenge.

DETAILED DESCRIPTION

Figures 1, 2:
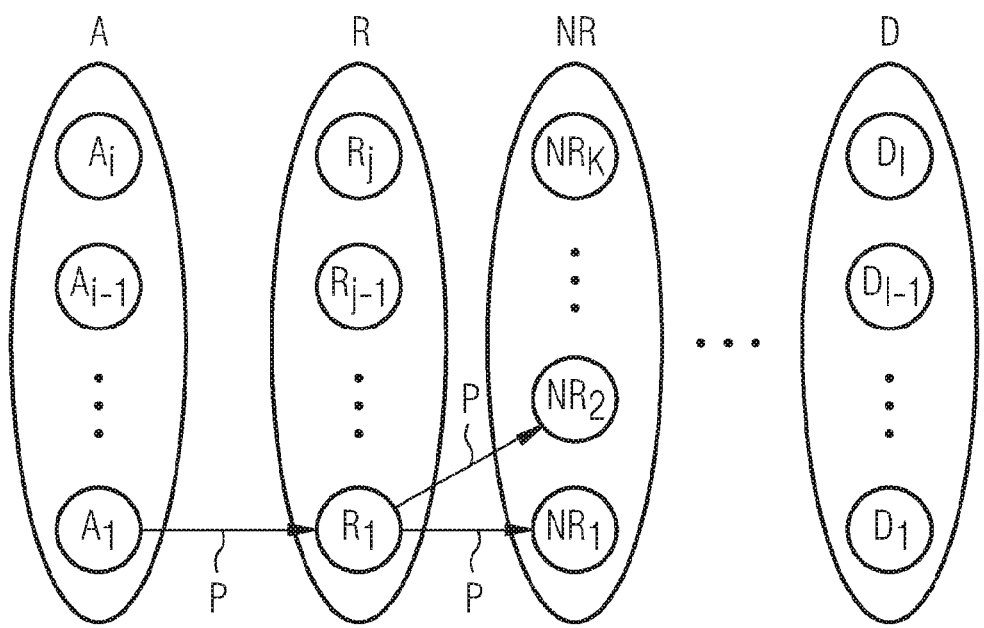
FIG. 1 shows a wireless mesh network illustrating the principle of the invention.
FIG. 2 shows a modification of a mesh subheader.

According to a first aspect, a method for secure data transmission in a wireless mesh network, the wireless mesh network comprising a sending node sending at least one packet to at least one forwarding node, the at least one forwarding node receiving the at least one packet from the sending node and forwarding the at least one packet to one or more receiving nodes and a destination node receiving the at least one packet from the at least one receiving node, comprises the steps of transmitting a challenge from the sending node, being a challenging node, to the at least one forwarding node, being a challenged node, causing the at least one forwarding node to reply both to the sending node and the at least one receiving node with a response, the response at least comprising transformed information about one or more of the at least one packet/packets which has/have been sent from the sending node to the destination node via the at least one forwarding node and the at least one receiving node, processing the response to find out whether the at least one forwarding node is misbehaving or not by verifying whether the transformed information is equal to an information which can be or has been derived from the requested packet/packets, wherein the processing is carried out both by the sending node and the at least one receiving node.

The method according to an embodiments enables the detection of routing misbehaviour, even in the case that overhearing of the activities of neighbouring wireless nodes is not possible. The method is applicable in the presence of encrypted transmissions at the wireless link-level. The method can be adapted to work in combination with a variety of routing protocols. The method is a challenge-response based scheme for detecting forwarding misbehaviour of neighbouring nodes. Therefore, the method can detect node misbehaviour even in the presence of per-link encryption at the MAC layer as often employed in state of the art wireless mesh networks.

According to a further embodiment, the transformed information is a hash sum for the requested packet/packets in the challenge, especially for immutable parts of the requested packet/packets. In this case only a small piece of information has to be exchanged between the challenged node and its two neighbours to detect node misbehaviour.

It may be advantageous if the hash sum is generated by a logic operation from hash values of respective packets. According to this embodiment, a hash value for each packet exchanged between two nodes will be calculated. If the challenging node asks the challenged node to transmit transformed information about more than one of the transmitted packets the hash sum can be calculated from the corresponding hash values. Thereby, the process of verification can be simplified.

To increase security, in a further embodiment the hash sum and/or the hash value is and/or are calculated by a one-way hash function.

According to a further embodiment in the challenge the transformed information about the last x packets is requested which packets have been sent from the sending node to the destination node via the at least one forwarding node and the at least one receiving node. The challenging node is free to choose the number x of packets for which he wants to receive the transformed information. By this embodiment detecting of misbehaviour of nodes can be improved.

According to a further embodiment the response further comprises an identifier of the challenging node being a previous hop of the challenged node receiving the challenge. In addition, the response further comprises an identifier of the next hop of the challenged node receiving the challenge of the requested and transmitted packets. Also, the response further comprises the number of requested packets transmitted from the challenging node to the challenged node. With this information detecting of misbehaviour can be improved.

In a first alternative the response to the challenging node and the receiving node will be without encryption. Alternatively, the response to the challenging node and the receiving node will be with encryption. The first alternative may be useful in wireless mesh networks which use per-link encryption. Thereby, it is not necessary that the challenged node encrypts the response with the corresponding encryption keys. Thereby, carrying out the method is simplified. According to the second alternative encryption of the response may be used if required by the mesh network.

According to a further embodiment the response may be transmitted as a broadcast message. The response may be processed by nodes which are addressed in this response.

According to a further embodiment, each of the sending nodes, the at least one forwarding node, the at least one receiving node and the destination node maintain a first list for information about packets received from a neighbour node and a second list for storing information about packets sent to a neighbour node. For each received packet stored in the first list one or more of the following parameters is stored: the hash value, the identifier of the previous neighbour node which transmitted the packet, the identifier of the node which transmitted the packet prior to the previous neighbour node and an information about the next hop for the packet. For each transmitted packet stored in the second list one or more of the following parameters is stored: the hash value, the identifier of the next neighbour node to which the packet is forwarded, and the identifier of the previous neighbour node which transmitted the packet. The first and the second list in one of the nodes are preferably updated on receiving or transmitting a packet. A challenged node uses the first list to find out the next hops for the requested packets received from the challenging node. The challenging node uses the second list to determine whether the transformed information received by the challenged node matches the transformed information for the packets sent to this node. Other nodes receiving the response from the challenged node and which are addressed in this response use the first list to check if the node really forwarded the requested packets it reports as forwarded. Therefore, it is possible to identify a malicious node which tries to manipulate the response. The challenged node only can fool the challenging node or the next hop but not both simultaneously and hence its forwarding misbehaviour can be detected.

Therefore, in a further improvement the challenge is transmitted periodically.

According to a second aspect, a computer program product directly loadable into the internal memory of a digital computer is proposed which computer program product comprises software code portions for performing the steps of the method according to various embodiments when said product is run on a computer. The computer program product can be in form of a CD-ROM, a diskette or just in form of a signal being transmitted within a computer network.

According to a third aspect, a node in a wireless mesh network is proposed. The wireless mesh network comprises a sending node sending at least one packet to the at least one forwarding node, the at least one forwarding node receiving the at least one packet from the sending node and forwarding the at least one packet to one or more receiving nodes, and a destination node receiving the at least one packet from the at least one receiving node. The node, being a challenging node, comprises a first means for transmitting a challenge to the at least one forwarding node causing the at least one forwarding node, being a challenged node, to reply both to the challenging node and the at least one receiving node with a response, the response at least comprising transformed information about one or more of the at least one packet/packets which has/have been sent from the challenging node to the destination node via the at least one forwarding node and the at least one receiving node, and a second means for processing the response to find out whether the at least one forwarding node is misbehaving or not by verifying whether the transformed information is equal to an information which can be or has been derived from the requested packet/packets, wherein the processing is carried out both by the sending node and the at least one receiving node.

The node may further comprise means for carrying out further steps according to the method.

According to a fourth aspect, a further node in a wireless mesh network is proposed. The wireless mesh network comprises a sending node sending at least one packet to at least one forwarding node, the at least one forwarding node receiving the at least one packet from the sending node and forwarding the at least one packet to one or more receiving nodes, and a destination node receiving the at least one packet from the at least one receiving node. The node, being a challenged node, comprises a means for receiving and processing a challenge from the sending node, being a challenging node, causing the challenged node to reply both to a challenging node and the at least one receiving node with a response, the response at least comprising transformed information about one or more of the at least one packet/packets which has/have been sent from the challenging node to the destination node via the at least one forwarding node and the at lest one receiving node, wherein the transformed information can be derived from the requested packet/packets.

In a further embodiment, this node comprises further means for carrying out further steps according to the method.

According to a fifth and a sixth aspect, the wireless mesh network comprises at least one node behaving as a challenging node and/or as a challenged node according to various embodiments.

The method according to various embodiments for detecting forwarding misbehaviour of neighbouring nodes is based on a challenge-response-procedure and will be explained by reference to FIG. 1 which shows a wireless mesh network. A, R, NR and D represent a set of nodes each. The set of nodes A comprises sending nodes $A_1, \ldots, A_{i-1}$ and $A_i$ (abbreviated $A_j$) which generate a packet or forward a packet. In this example the sending nodes $A_i$ wants to verify the forwarding behaviour of their next hop for sent packets. Set of nodes R comprises nodes $R_1, R_{j-1}$ and $R_j$ (abbreviated $R_j$) which represent possible next hops for packets P sent by nodes $A_i$. Correspondingly, the set of nodes NR comprises nodes $NR_1, NR_2, \ldots, NR_k$ (abbreviated nodes $NR_k$ and called receiving nodes) representing next hops for the nodes $R_j$. Accordingly, packets P transmitted by a sending node $A_i$ to at least one forwarding node $R_j$ will be forwarded to at least one node $NR_k$ on their way towards a destination node $D_1, \ldots, D_{l-1}, D_l$ (abbreviated $D_l$) of set of nodes D. A node $D_l$ is assumed to be a destination for the packets originated or initially transmitted or forwarded by the sending node $A_i$. It is to be noted that the sets of nodes A, R, NR and D are assumed to be disjoint. However, set of nodes A, R, NR and D could be non-disjoint in practice, too.

Reference numeral P in FIG. 1 can represent one or a number of subsequent packets. For ease of description in the following it will be referred to a plurality or a number of packets. Within this description it is assumed that the packets P are originated or initially forwarded by a node $A_i$, in FIG. 1 $A_1$.

$P^{ab}_x$ denotes the last packet transmitted by a node a to a node b. $P^{ab}_x$ denotes the last packet transmitted by the node a to the node b.

Furthermore, a mathematical function hashsum $(h_1, \ldots, h_n)$ is used which is basically a mapping $(\{H\}, \ldots, \{H\}) \rightarrow H$, where $H \in \{0,1\}^{160}$ (H is a 160-digit binary value), $h_i \in H$ for $i \in N$. The set can be considered to be a set of 160 bit hashes computed for individual packets using a hash function. The function hashsum( ) has to be commutative as well as associative. The semantics of hashsum( ) is as follows:

hashsum$(P_1, \ldots, P_n)$=hash$(P_1) \oplus \ldots \oplus$hash$(P_n)$.

If a used hash value hash( ) is in addition an one-way hash function improved security against misbehaviour can be implemented. However, this is optional. The operation $\oplus$ is arbitrary as long as hashsum( ) holds defined properties. In the present example $\oplus$ corresponds to a xor operation.

Hereinafter, the challenge-response mechanism according to various embodiments of the method will be described. The node $A_1$ wishing to verify the forwarding behaviour of its neighbour, forwarding node $R_1$, transmits a challenge to the forwarding node R1. The challenge may have a message format as shown in FIG. 3. Within this table a challenge is depicted with "WatchAnt Request", thereby indicating the number and the identifiers of the challenged node or nodes ("Nr. challenged nodes (n)" having a size of 8 bits and "Node ID" having a size of 16 Bits) and the number of packets which shall be validated ("packet count"), having a size of 16 bits. Accordingly, the challenge identifies the address node (here $R_1$) and asks it to reply with the forwarding information for the last i packets sent by the challenging node $A_1$ to the challenged node $R_1$. In this example $R_1$ is requested to reply specifying information about the forwarding for the packets $P_{x-i}^{A_1R_1} \ldots P_x^{A_1R_1}$. In reaction, $R_1$ then sends a response which format is shown in FIG. 4. As can be seen from this table the response consists of a set of tuples identifying the previous hop ("Previous Hop", 16 bits) which is the challenging node (here $A_1$), the next hop ("Nr. Next Hop Nodes (n)", 8 bits and "Node ID", 16 bits) for a set of packets, the number of packets ("Nr. Packets forwarded", 16 bits) forwarded to the next hop, and the hash value ("Hash Value", 160 bits) for all the packets sent to the next hop.

To be more concrete, it is assumed that $A_1$ had sent a challenged as specified above. Furthermore, it is assumed that the node $R_1$ has forwarded the packets only to the single receiving node $NR_1$. In this example, the challenge had asked for the last two packets. The response then looks like [$A_1$, $NR_1$, 2, hashsum$(P_x^{A_1R_1}, P_{x-1}^{A_1R_1})$]. This response is transmitted as a broadcast message without encryption. The number of previous packets for which the hashsum( ) is to be computed is depicted with WaReqNum. In the above example, WaReqNum=2. This parameter determines the probability of detecting forwarding misbehaviour of neighbouring nodes. Thus, when $R_1$ transmits the response, it will be received by its neighbours, the sending node $A_1$ and the receiving nodes $NR_1$ and $NR_2$. Only nodes which are addressed in the response will process the reply. In this example, the nodes $A_1$ and $NR_1$ will process the received reply.

By verifying the reply or response either $A_1$ or $NR_1$ or both will be able to detect forwarding misbehaviour of node $R_1$ in the case this node is misbehaving. In general, the response sent by the challenged node will be verified by the challenging node and the reported next hops after the challenged node. Both of these nodes need to be able to verify the reply, whereas the challenged node needs to generate the response.

Hence, each of the above nodes needs to maintain certain data structures which are described next. Each node maintains two lists, an InList for information packets received from a neighbour node, and an OutList for storing information about packets sent to a neighbour node, for each neighbouring node. As a result, one node can maintain a set of InLists and OutLists according to the number of neighbours to this node.

Hereinafter, hashhlm(P) denotes the hash sum of the immutable parts of packet P. An entry in the InList for a packet received contains hash(P), the node identifier of the neighbour which transmitted this packet (i.e. the previous node), and the node identifier of the node which transmitted the packet prior to the previous node. In addition, a field in the InList can be used to enter the information about the next hop for the packet.

The OutList contains for the packet transmitted hashhlm (P) and the node identifier of the node to which the packet was forwarded. The number of entries in the above lists can be limited to some maximum value. In addition, to be able to verify the response of the challenged node, information is needed about the previous two hops for the packets. Therefore, for each transmitted packet, a previous node identifier field is set in addition to the transmitter's node identifier.

On receiving or transmitting a packet the InList or the OutList are updated and all fields in these lists are set as specified previously.

The sending node periodically issues challenges as explained previously asking for the information about the previous WaReqNum packets sent to its neighbour node, the forwarding node. The challenged node then uses the InList to find out the next hops for the last WaReqNum packets received from the challenger. Using the hash values for the packets in question found from the InList and the corresponding next hops, the challenged node uses the hashsum function to generate the response. This response is then transmitted.

The challenger uses its OutLists to determine whether the hashsum reported by the challenged node matches the hashsum for the packets sent to the node. Other nodes corresponding to the receiving nodes receiving the response and addressed in a reply use their InList to check if the challenged node really forwarded the packets which the challenged node reports as forwarded.

It can be seen from this procedure that a malicious node which tries to manipulate the response can fool only the challenging node or the next hop with regard to the challenged hop but not both simultaneously. Hence, forwarding misbehaviour of a challenged node will be detected.

The parameter WaReqNum is important for determining the ability of the method to detect forwarding a misbehaviour. In case that a malicious node drops packets with a probability of $P_{Drop}$ instead of forwarding them, the probability that a packet is not dropped is given by $(1-P_{Drop})$. Given a request asking for information about the last WaReqNum packets is addressed to a malicious node its malicious behaviour will not be detected if and only if it has not dropped a single packet in the last WaReqNum packets. The probability that the node has not dropped a single packet in the last WaReqNum packets is given by $(1-P_{Drop})^{WaReqNum}$ which is equal to the probability that a malicious node will be undetected. Thus, the probability that a malicious node dropping packets with a probability $P_{Drop}$ will be detected is $1-(1-P_{Drop})^{WaReqNum}$.

The various embodiments may be implemented in the context of a 802.16 mesh network according to the IEEE standard 802.16-2004. A mesh subheader in this standard as depicted in FIG. 2 may be used to implement the method described above. In FIG. 2 this mesh subheader contains the variables "Xmt Node Id" having a size of 16 bits and "Prev Node Id" having a size of 16 bits, too. Subsequently, the mesh subheader contains node Ids of a transmitting node and the previous node.

The node Id of the previous forwarder of the message is included in the variable "Prev Node Id". The modification according to FIG. 2 allows a node to determine on reception the node Id of the second last forwarder.

The various embodiments enable the detection of routing misbehaviour even in the case that overhearing of the activities of neighbouring wireless nodes is not possible. The various embodiments are also applicable in the presence of encrypted transmissions at the wireless link-level and can be adapted to work in combination with a variety of routing protocols. Furthermore, the method described can detect node misbehaviour even in the presence of per-link encryption at the MAC layer which is used in state-of-the-art wireless mesh networks. The advantage of monitoring the forwarding behaviour lies in the detection and identification of misbehaving nodes. Those free rider nodes try to benefit from the services of the participating nodes in the network without own contribution. If those nodes can be traced and if they become too many it can have a major impact on the performance of the network in terms of throughput and reliability.

What is claimed is:

1. A method for secure data transmission in a wireless mesh network a sending node sends at least one packet to at least one forwarding node, the at least one forwarding node receives the at least one packet from the sending node and forwarding the at least one packet to one or more receiving nodes, and a destination node receives the at least one packet from the at least one receiving node, the method comprising the steps of:
   a transmitter of the sending node, being a challenging node, transmitting a challenge to a forwarding node,
   the forwarding node, being a challenged node executing computer-readable instructions stored in non-transitory media to:
      generate a response for each of the sending node and the at least one receiving node, wherein both the response for the sending node and the response for the at least one receiving node include transformed information about one or more of the at least one packet which have been sent form the sending node to the destination node via the at least one forwarding node and the at least one receiving node, and
      transmit the respective responses to the sending node and the at least one receiving node, and
   at each of the sending node and the at least one receiving node, executing computer-readable instructions stored in non-transitory media to process the respective response to find out whether the forwarding node is misbehaving or not by verifying whether the same transformed information in the respective response is equal to an information which can be or has been derived from the requested packet/packets, wherein the processing is carried out both by the sending node and the at least one receiving node,
   wherein the transformed information is a hash sum for the requested packet/packets in the challenge, the hash sum being generated by a logic operation from hash values of respective packets.

2. The method according to claim 1, wherein at least one of the hash sum and the hash values is/are calculated by a one-way hash function.

3. The method according to claim 1, wherein in the challenge, the transformed information about the last x packets is requested which packets have been sent from the sending node to the destination node via forwarding node and the at least one receiving node.

4. The method according to claim 1, wherein the response further comprises an identifier of the challenging node being a previous hop of the challenged node receiving the challenge.

5. The method according to claim 1, wherein the response further comprises an identifier of the next hop of the challenged node receiving the challenge of the requested and transmitted packets.

6. The method according to claim 1, wherein the response further comprises the number of requested packets transmitted from the challenging node to the challenged node.

7. The method according to claim 1, wherein the response to the challenging node and the receiving node will be without encryption.

8. The method according to claim 1, wherein the response to the challenging node and the receiving node will be with encryption.

9. The method according to claim 1, wherein the response is transmitted as a broadcast message.

10. The method according to claim 1, wherein the response will be processed by nodes which are addressed in the response.

11. The method according to claim 1, wherein each of the sending nodes, the forwarding node, the at least one receiving node and the destination node maintains a first list for information about packets received from a neighbour node and a second list for storing information about packets sent to a neighbour node.

12. The method according to claim 11, wherein for each received packets stored in the first list one or more parameters from the group consisting of the following parameters is stored:
the hash value,
the identifier of the previous neighbour node which transmitted the packet,
the identifier of the node which transmitted the packet prior to the previous neighbour node, and
an information about the next hop for the packet.

13. The method according to claim 11, wherein for each transmitted packet stored in the second list one or more parameter from the group consisting of the following parameters is stored:
the hash value,
the identifier of the next neighbour node to which the packet is forwarded, and
the identifier of the previous neighbour node which transmitted the packet.

14. The method according to claim 11, wherein the first and the second list in one of the nodes are updated on receiving or transmitting a packet.

15. The method according to claim 11, wherein the challenge is transmitted periodically.

16. A computer program product stored in tangible, non-transitory computer-readable media of a digital computer, comprising software code portions for performing the steps of claim 1 when said product is executed by a processor.

17. A node in a wireless mesh network comprising a sending node sending at least one packet to at least one forwarding node, the at least one forwarding node receiving the at least one packet from the sending node and forwarding the at least one packet to one or more receiving nodes, and a destination node receiving the at least one packet from the at least one receiving node,
wherein the node, being a challenging node, comprises:
a transmitter for transmitting a challenge to the at least one forwarding node causing the at least one forwarding node, being a challenged node, to reply both to the challenging node and the at least one receiving node with a response, wherein both the response for the sending node and the response for the at least one receiving node include the same transformed information about one or more of the at least one packet/packets which has/have been sent form the challenging node to the destination node via the at least one forwarding node and the at least one receiving node, and
a processor for processing the response to determine whether the at least one forwarding node is misbehaving or not by verifying whether the transformed information received in the response from the at least one forwarding node is equal to an information which can be or has been derived from the requested packet/packets, wherein the same transformed information is similarly used by the at least one receiving node to determine whether the at least one forwarding node is misbehaving or not,
wherein the transformed information is a hash sum for the requested packet/packets in the challenge, and wherein the node comprises further means for generating the hash sum by a logic operation from hash values of respective packets.

18. A node in a wireless mesh network comprising a sending node sending at least one packet to at least one forwarding node, the at least one forwarding node receiving the at least one packet from the sending node and forwarding the at least one packet to one or more receiving nodes, and a destination node receiving the at least one packet from the at least one receiving node,
wherein the node, being a challenged node, comprises a computer program stored in non-transitory media and executable to:
receive a challenge from the sending node, being a challenging node, and
in response to receiving the challenge:
generate a response for each of the sending node and the at least one receiving node, wherein both the response for the sending node and the response for the at least one receiving node include transformed information about one or more of the at least one packet which have been sent form the sending node to the destination node via the at least one forwarding node and the at least one receiving node, and
transmit the respective responses to the sending node and the at least one receiving node, such that both the sending node and the at least one receiving node are able to determine whether the node is misbehaving or not based at least on the same transformed information received from the node,
wherein the transformed information is a hash sum for the requested packet/packets in the challenge, and wherein the node comprises further means for generating the hash sum by a logic operation from hash values of respective packets.

19. The method according to claim 1, wherein the transformed information is a hash sum for immutable parts of the requested packet/packets in the challenge.

20. The method according to claim 1, wherein the sending node, being the challenging node, transmits a challenge to multiple forwarding nodes, such that each forwarding node, being a challenged node, generates and transmits responses for each of the sending node and the at least one receiving node.

21. The method according to claim 1, wherein the non-transitory media comprises at least one of: internal memory of a digital computer, a CD-ROM, and a diskette.

* * * * *